Nov. 16, 1965 D. W. SMITH 3,217,994

BRAKING MECHANISM FOR TAPE RECORDERS

Filed July 6, 1962 2 Sheets-Sheet 1

INVENTOR.
DOUGLAS W. SMITH
BY
Brown, Jackson, Boettcher & Dienner
ATTYS.

BRAKING MECHANISM FOR TAPE RECORDERS

Filed July 6, 1962 2 Sheets-Sheet 2

INVENTOR.
DOUGLAS W. SMITH
BY
Brown, Jackson, Boettcher & Dienner
ATTYS.

United States Patent Office 3,217,994
Patented Nov. 16, 1965

3,217,994

BRAKING MECHANISM FOR TAPE RECORDERS

Douglas W. Smith, St. Joseph, Mich., assignor to V–M Corporation, Benton Harbor, Mich., a corporation of Michigan Filed July 6, 1962, Ser. No. 207,948
11 Claims. (Cl. 242—55.12)

The present invention relates to braking mechanism for tape recorders, and in particular to braking mechanism which is adapted to brake only one tape reel hub at a time, depending upon the direction of tape travel.

It has been customary heretofore to provide tape recorders which include braking mechanism comprising brake shoes or the like for engaging the tape reel hubs to brake the latter when a stop button or the like is actuated. Such braking mechanism is normally considered necessary, because in the absence of braking a reel of tape will continue to rotate due to inertia after the drive therefor has been disconnected or de-energized thus causing undesirable spillage of the tape.

While tape recorders having known types of braking mechanisms will operate satisfactorily under certain conditions, they are not adapted to function properly where one of the two tape reels is substantially heavier than the other. Thus, if the tape is being driven at high speed in a forward direction from the left hand reel to the right hand reel, and if the drive means is shut off and the brakes applied at a time when the left hand reel carries considerably more tape than the right hand reel, the left hand reel due to its greater weight and inertia will tend to rotate a greater amount than the right hand reel after the brakes are simultaneously applied to each, thus causing tape spillage.

The foregoing problem is particularly acute where reels of different sizes are employed, as is frequently done when operating tape recorders. The larger size reel, when it happens to be the feeding reel or the reel from which the tape is being fed, will tend to rotate a greater amount after application of the brakes than the smaller take-up reel, and it will be readily apparent that in such instances tape will be spilled out.

It is an object of the present invention to provide braking mechanism for tape recorders which substantially eliminates the foregoing problems and minimizes tape spillage, even when reels of unlike sizes are used.

Another object of the invention is to provide braking mechanism for the tape recorders which is adapted to brake only one reel at a time, and which is controlled in accordance with the direction of tape travel so as to brake only the feeding reel.

In furtherance of the foregoing objects, I provide blocking means associated with the brake shoe assemblies for the left and right hand tape reel hubs. The blocking means is movable between two positions whereby when in a first position it will prevent the brake shoe associated with the left hand reel hub from being operated, and when in a second position it will prevent the brake shoe assembly associated with the right hand reel hub from being operated.

In combination with the blocking means I provide control means operative in response to the direction of tape travel for moving the blocking means to a corresponding one of its two positions. Thus, when tape is being moved in a forward direction from the left hand reel to the right hand reel, the control means will move the blocking means to a first position wherein the latter will prevent the brake shoe associated with the right hand reel from being operated. When the tape is being moved in a reverse direction as during rewind, the control means will move the blocking means to a second position wherein it will prevent the operation of the brake shoe assembly associated with the left hand reel.

It will be understood that upon stopping of the tape recorder, with the brakes being applied to the feeding reel only and not to the take-up reel, the tape will tend to remain taut and tape spillage will be minimized, even where the feeding reel is of a substantially larger size than the take-up reel.

Other objects, uses and advantages of the invention will become apparent, or be obvious, from the following specification, particularly when considered in connection with the drawings in which.

Figures 1, 2, 3:
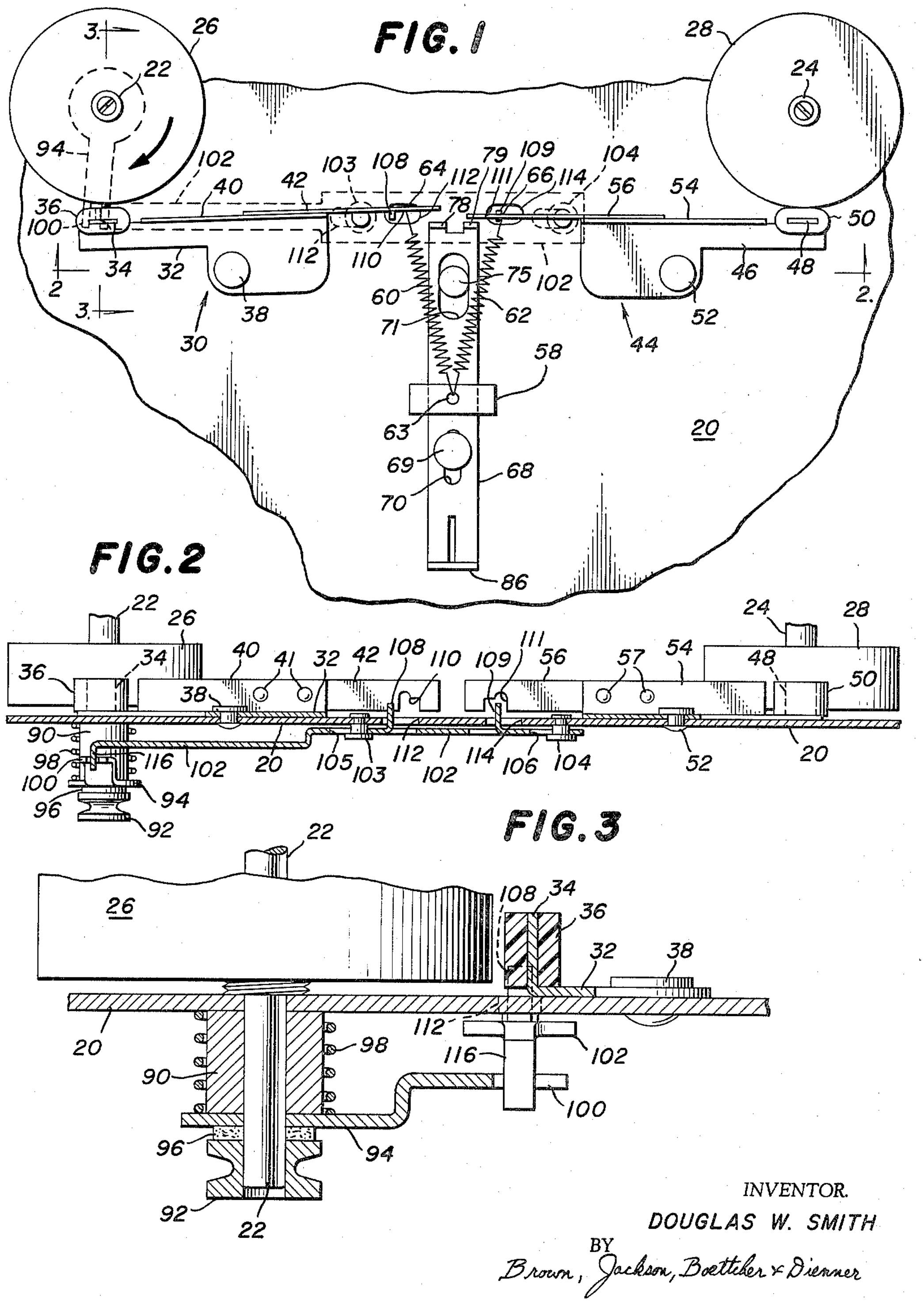
FIGURE 1 is a fragmentary top plan view of a tape recorder, with the top cover and certain interior parts removed, showing braking mechanism constructed in accordance with the present invention.
FIGURE 2 is a vertical section taken substantially along the line 2—2 of FIGURE 1.
FIGURE 3 is an enlarged partial section taken substantially along the line 3—3 of FIGURE 1.

Referring now to the drawings, there is shown a base plate 20 and a pair of rotatable reel hub shafts comprising a left hand shaft 22 and a right hand shaft 24 which extend vertically from the base plate. A left hand reel hub 26 is mounted on the shaft 22 for rotation therewith, and in a similar fashion a right hand reel hub 28 is mounted on the shaft 24. A left hand tape reel (not shown) is adapted to be mounted over the shaft 22 so as to surmount the hub 26, and a right hand tape reel (not shown) is similarly adapted to be mounted on the shaft 24 so as to surmount the hub 28.

The tape reels are keyed or otherwise secured to their corresponding hub members for rotation therewith to feed the tape from one reel to another. When the right hand reel hub 28 is driven in a counterclockwise direction by drive means (not shown), the tape is moved in a forward direction from the left hand reel to the right hand reel. The tape will move forwardly past a recording and reproducing head during play or record. Many recorders also have a fast forward setting where the tape is simply moved forwardly at high speed from one reel to the other. When the left hand reel hub 26 is rotated in a clockwise direction, the tape is moved in a reverse direction as during rewind from the right hand reel to the left hand reel.

A brake shoe assembly for the left hand reel hub is indicated generally at 30 and comprises a lever 32 having an upturned tab 34 at one end on which a brake shoe 36 is mounted for engagement with the rim of the reel hub 26. The lever 32 is pivotally mounted on the base plate 20 by means of a rivet or the like 38, whereby upon rotation of the lever in a clockwise direction, the brake shoe 36 is urged against the reel hub 26 to brake the latter and the left hand reel mounted thereon. The lever 32 has an upwardly bent portion 40 along one side on which an arm 42 is mounted by rivets 41 (see FIGURE 2) so as to extend to the right beyond the end of the lever.

A similar brake shoe assembly 44 associated with the right hand reel hub 28 comprises a lever 46 having an upturned tab 48 at one end on which a brake shoe 50 is mounted for engagement with the rim of the reel hub 28. The lever 46 is pivotally secured to the top of the base plate 20 by a rivet 52, whereby upon rotation of the lever 46 in a counterclockwise direction, the brake shoe 50 will be urged into engagement with the hub 28 to brake the latter and the right hand reel mounted thereon. The lever 46 has an upturned portion 54 along one side on which an arm 56 is mounted by rivets 57 so as to extend to the left beyond the end of the lever.

A mounting plate 58 is fixedly secured to the base plate 20, and a pair of tension springs 60 and 62 each have one end secured to the plate 58 and their opposite ends secured at the end of a corresponding one of the brake shoe arms 42 and 56. Thus, one end of the spring 60 is anchored to the plate 58 at 63, and the other end of the spring is secured to the end of the arm 42 at 64. In a similar fashion, the spring 62 has one end secured at 63, and the other end secured to the brake shoe arm 56 at 66. It will be seen that the tension springs 60 and 62 urge the brake shoe levers 32 and 46 in a clockwise and a counterclockwise direction, respectively, so as to bias the brake shoes 36 and 50 into engagement with the corresponding reel hubs 26 and 28.

Figures 4, 5, 6:
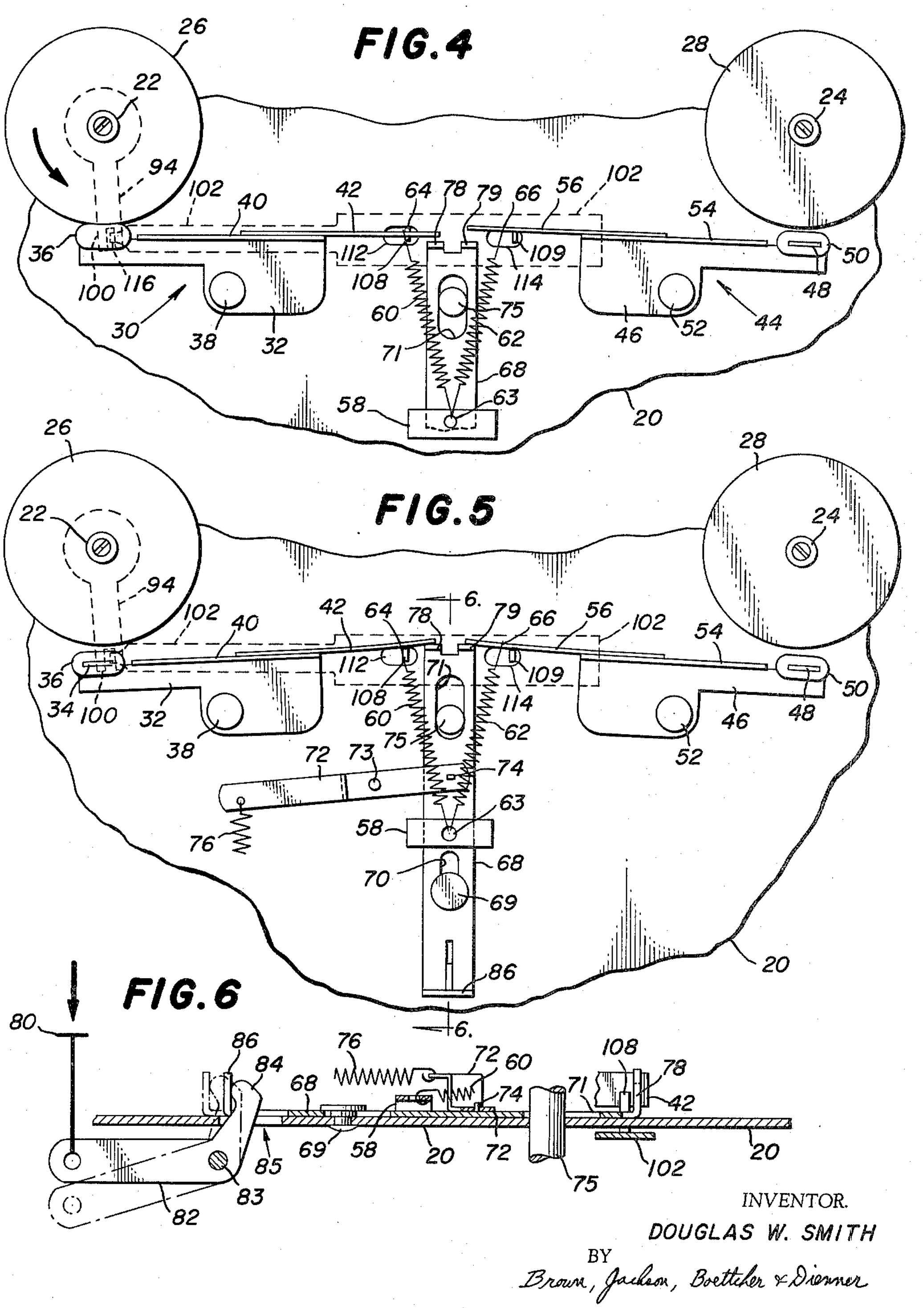
FIGURE 4 is a view similar to FIGURE 1, partly broken away, showing the position of the braking mechanism when the tape is moving in a forward direction from the left hand reel to the right hand reel and the brakes are applied, the brake shoe associated with the right hand reel being held in an inoperative position.
FIGURE 5 is a view similar to FIGURE 4 showing the braking mechanism in off position wherein both brake shoes are disengaged from the corresponding reel hubs.
FIGURE 6 is a partial vertical section taken substantially along the line 6—6 of FIGURE 5.

An actuating slide 68 is mounted on the base plate 20 by a rivet 69 which projects through a longitudinal slot 70 in the slide. A slot 71 is also provided so as to permit a drive control rod 75 to extend through the slide 68. FIGURE 5 shows a lever 72 which is pivotally secured to the base plate by a pin 73, the outer end of the lever being provided with an aperture adapted to receive a small upwardly bent tab 74 which is integral with the slide 68, whereby the slide 68 may be moved to its forward or release position as shown in FIGURE 5 upon rotation of the lever 72 in a counterclockwise direction. A tension spring 76 has one end (not shown) secured to the base plate 20 and the other end secured to the lever 72 so as to urge the latter in a counterclockwise direction about the pin 73 and thereby bias the brake actuator slide 68 toward its extreme forward position as in FIGURE 5. When the slide 68 is in its forward position, a pair of upwardly bent tabs 78 and 79 on the end thereof engage the corresponding ends of the brake shoe arms 42 and 56 and pivot the brake shoe levers 32 and 46 so as to cause the brake shoes 36 and 50 to be held in inoperative positions. In this manner, the brake shoes 36 and 50 are normally held disengaged from the reel hubs 26 and 28 by the brake actuator slide 68.

In order to apply the brakes, a stop button or the like shown schematically at 80 in FIGURE 6 is depressed, thus causing a bell crank 82 to be pivoted about a pin 83 from the position shown in solid lines to the position shown in dash-dot lines. A nose portion 84 on the end of the bell crank 82 projects upwardly through aligned apertures 85 in the base plate 20 and in the slide 68 so as to engage an upwardly bent tab 86 on the rear end of the slide, whereby upon depression of the button 80, the nose portion 84 moves the slide 68 rearwardly.

When the slide 68 is moved rearwardly, if the brake shoe assembly 30 were free to be rotated in a clockwise direction by the tension spring 60, and if the brake shoe assembly 44 were free to be rotated in a counterclockwise direction by the tension spring 62, then both of the brake shoes 36 and 50 would be engaged against the corresponding reel hubs 26 and 28. However, in accordance with the present invention, blocking means is provided for preventing one of the two brake shoe assemblies from being moved to operative position, and such mechanism will now be described.

FIGURE 3 shows a tubular spacer 90 mounted on the reel hub shaft 22 adjacent the underside of the base plate 20, and a pulley 92 is pressed on or otherwise fixedly secured to the lower end of the shaft 22. The pulley 92 may be used to drive an endless belt associated with a tape locating mechanism such as a digital counter or the like, but the latter forms no part of the present invention and will not be described.

A drag plate 94 is rotatably mounted on the shaft 22, and a cork clutch washer 96 is mounted on the shaft between the drag plate and the pulley 92. A compression spring 98 is positioned on the spacer 90 between the underside of the base plate 20 and the drag plate 94, so as to bias the latter downwardly against the clutch washer 96. During movement of the tape between the reels mounted on the reel hubs 26 and 28, the reel hub 26 together with the shaft 22 and pulley 92 will rotate, and will thereby cause the drag plate 94 to be rotated a limited amount. The direction of rotation of the drag plate 94 depends upon the direction of rotation of the reel hub 26, which in turn is determined by the direction of tape travel.

Referring to FIGURE 1, when the tape is moving in a forward direction from the left hand reel to the right hand reel, the left hand reel hub 26 will be rotated in a counterclockwise direction. The shaft 22 and the pulley 92 will be rotated along with the hub 26, and such rotation of the pulley 92 will cause the drag plate 94 to be rotated in a counterclockwise direction, torque being transmitted from the pulley 92 through the clutch washer 96 to the drag plate which is biased against the washer by the compression spring 98. The drag plate 94 is adapted to be rotated in either direction only a limited amount, as will be explained hereinafter.

The drag plate 94 is provided with a bifurcated end 100 which is operatively associated with one end of a brake slide plate 102. As shown in FIGURE 2, the slide plate 102 is supported from the underside of the base plate 20 by a pair of rivets 103 and 104 which project through corresponding longitudinal slots 105 and 106 provided in the slide plate. The plate 102 is thus adapted to slide laterally relative to the base plate 20 an amount limited by the length of the slots 105 and 106.

The slide plate 102 is provided with a pair of upright tabs 108 and 109 which are adapted to cooperate with cutouts 110 and 111 formed in the ends of the brake shoe arms 42 and 56. Slots 112 and 114 are formed in the base plate 20 so as to permit the tabs 108 and 109 to project upwardly therethrough. FIGURE 2 shows the slide plate 102 in its extreme left hand position wherein the upright tab 109 is in alignment with cutout 111 in the arm 56, and in this position the slide plate will not interfere with the operation of the right hand brake shoe assembly 44. However, it will be noted that the upstanding tab 108 is out of alignment with the cutout 110 so as to block the arm 42 and thereby prevent the brake shoe assembly 30 from being rotated in a clockwise direction to its operative position. Accordingly, if the stop button 80 (see FIGURE 6) is actuated to apply the brakes while the slide plate 102 is in the position shown in FIGURE 2, only the right hand brake shoe 50 will be moved to operative position (see FIGURE 1).

In a similar manner, when the slide plate 102 is moved to its extreme right hand position, the upstanding tab 108 will be aligned with the cutout 110, and the tab 109 will be moved out of alignment with the cutout 111. Upon actuation of the brakes with the slide 102 in the latter position, the left hand brake shoe 36 will be engaged, and the right hand brake shoe assembly 44 will be blocked against movement to its operative position (see FIGURE 4).

It will now be understood that when the tape is being driven in a forward direction from the left hand reel to the right hand reel, the reel hub 26 will rotate in a counterclockwise direction and will transmit a torque through the clutch washer 96 to the drag plate 94 so as to rotate the latter in a counterclockwise direction causing the slide plate 102 to be moved to its extreme right hand position. It will be noted that the slide plate has a downwardly bent end portion 116 which projects into the bifurcated end 100 of the drag plate 94 to effect a drive connection therebetween. Consequently, the right hand brake shoe assembly 44 will be blocked, while the left hand brake shoe assembly 30 will be operated upon actuation of the braking mechanism. In other words, the left hand or feeding reel will be braked, and the right hand or take-up reel will not be braked, thus minimizing any possibility of tape spillage, even when the left hand reel is of a substantially larger size than the right hand reel.

When the tape is being driven in the reverse direction from the right hand reel to the left hand reel as during rewind, the slide plate 102 will be moved to its extreme left hand position so as to prevent operation of the brake shoe assembly 30, while freeing the right hand brake shoe assembly 44. Thus, regardless of the direction of tape travel, it is the feeding tape reel which is adapted to be braked, while the take-up reel is stopped due to the tension in the tape.

It will of course be understood that slippage will occur between the clutch washer 96 and the drag plate 94 once the slide plate 102 reaches the limit of its travel. The compression spring 98 should be sufficiently strong to produce the desired movement of the drag plate 94, and yet not so strong as to produce any appreciable drag or braking action on the tape reel hub 26.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. For use in a tape recorder having left and right hand tape reels and drive means for moving the tape in either direction from a feeding reel to a take-up reel, braking mechanism comprising, in combination, first braking means adapted to brake the left hand tape reel, second braking means adapted to brake the right hand tape reel, means for moving said first and second braking means to operative positions, blocking means movable to a first position to prevent the operation of said first braking means and movable to a second position to prevent the operation of said second braking means, and means responsive to the direction of tape travel for controlling the position of said blocking means to prevent the operation of the braking means associated with the take-up reel.

2. For use in a tape recorder having left and right hand tape reels and drive means for moving the tape in either direction from a feeding reel to a take-up reel, braking mechanism comprising, in combination, first braking means adapted to brake the left hand tape reel, second braking means adapted to brake the right hand tape reel, means for causing a selected one of said first and second braking means to be moved to operative position, one braking means being adapted for operation when the tape is moving in one direction and the other braking means being adapted for operation when the tape is moving in the opposite direction, clutch means associated with one of said reels, and control means associated with said clutch means and movable in accordance with the direction of rotation of said one reel for determining which one of said braking means is to be adapted for operation.

3. For use in a tape recorder having left and right hand tape reels and drive means for moving the tape in either direction from a feeding reel to a take-up reel, braking mechanism comprising, in combination, first braking means adapted to brake the left hand tape reel, second braking means adapted to brake the right hand tape reel, means for moving said first and second braking means to operative positions, clutch means associated with one of said reels, and means operatively associated with said clutch means and movable in accordance with the direction of rotation of said one reel for preventing the braking means assocated with the take-up reel from being moved to operative position.

4. For use in a tape recorder having left and right hand tape reels and drive means for moving the tape in either direction from a feeding reel to a take-up reel, braking mechanism comprising, in combination, first braking means adapted to brake the left hand tape reel, second braking means adapted to brake the right hand tape reel, means for moving said first and second braking means to operative positions, blocking means movable to first position to prevent the operation of said first braking means and movable to a second position to prevent the operation of said second braking means, clutch means associated with one of said reels, and means operatively associated with said clutch means and movable in accordance with the direction of rotation of said one reel for moving said blocking means between said first and second positions so as to prevent the operation of the braking means associated with the take-up reel.

5. For use in a tape recorder having left and right hand tape reels and drive means for moving the tape in either direction from a feeding reel to a take-up reel, braking mechanism comprising, in combination, first braking means adapted to brake the left hand tape reel, second braking means adapted to brake the right hand tape reel, means for moving said first and second braking means to operative positions, a rotatable drag lever associated with one of said reels, clutch means for providing a driving connection between said one reel and said drag lever for effecting rotation of said lever in the same direction as said one reel, and a plate member slidable laterally to a first position to prevent the operation of said first braking means and slidable in the opposite direction to prevent the operation of said second braking means, one end of said plate member being associated with the end of said drag lever whereby said plate will be moved laterally to one of its two positions in accordance with the direction of rotation of said one reel.

6. For use in a tape recorder having left and right tape hand tape reels and drive means for moving the tape in either direction from a feeding reel to a take-up reel, braking mechanism comprising, in combination, a first pivotally mounted brake shoe assembly having at its outer end a first brake shoe adapted to brake said left hand reel and having a first arm extending inwardly from its opposite end, a second pivotally mounted brake shoe assembly having at its outer end a second brake shoe adapted to brake said right hand reel and having a second arm extending inwardly from its opposite end toward said first arm, said first and second arms being provided with first and second cutout portions respectively, means for pivotally moving said first and second brake shoe assemblies to operative positions, a rotatable drag lever associated with one of said reels, clutch means for providing a driving connection between said one reel and said drag lever for effecting rotation of said lever in the same direction as said one reel, and a plate member having first and second projecting means thereon for cooperation with said cutout portions, said plate member being slidable laterally to a first position wherein said first projecting means is out of alignment with said first cutout portion and said second projecting means is in alignment with said second cutout portion as as to prevent the operation of said first brake shoe assembly, and slidable laterally in the opposite direction to a second position wherein said first projecting means is in alignment with said first cutout portion and said second projecting means is out of alignment with said second cutout portion so as to prevent the operation of said second brake shoe assembly, one end of said plate member being associated with the end of said drag lever whereby said plate will be moved laterally to one of its two positions in accordance with the direction of rotation of said one reel.

7. For use in a tape recorder having left and right hand tape reels and drive means for moving the tape in either direction from a feeding reel to a take-up reel, braking mechanism comprising, in combination, direction sensing means associated with one of said reels and movable therewith to a predetermined positon in accordance with the direction of rotation of said reel, first braking means adapted to brake the left hand tape reel, second braking means adapted to brake the right hand tape reel, means for causing a selected one of said first and second braking means to be moved to operative position, one braking means being adapted for operation when the tape is moving in one direction and the other braking means being adapted for operation when the tape is moving in the opposite direction, and control means responsive to movement of said direction sensing means for determining which one of said braking means is to be adapted for operation.

8. For use in a tape recorder having left and right hand tape reels and drive means for moving the tape in either direction from a feeding reel to a take-up reel, braking mechanism comprising, in combination, direction sensing means associated with one of said reels and movable therewith to a predetermined position in accordance with the direction of rotation of said reel, first braking means adapted to brake the left hand tape reel, second braking means adapted to brake the right hand tape reel, means for moving said first and second braking means to operative positions, and means responsive to movement of said direction sensing means for preventing the braking means associated with the take-up reel from being moved to operative position.

9. For use in a tape recorder having left and right hand tape reels and drive means for moving the tape in either direction from a feeding reel to a take-up reel, braking mechanism comprising, in combination, a rotatable drag lever associated with one of said reels for limited rotation therewith to a predetermined position in accordance with the direction of rotation of said reel, first braking means adapted to brake the left hand tape reel, second braking means adapted to brake the right hand tape reel, means for causing a selected one of said first and second braking means to be moved to operative position, one braking means being adapted for operation when the tape is moving in one direction and the other braking means being adapted for operation when the tape is moving in the opposite direction, and control means responsive to movement of said rotatable drag lever for determining which one of said braking means is to be adapted for operation.

10. For use in a tape recorder having left and right hand tape reels and drive means for moving the tape in either direction from a feeding reel to a take-up reel, braking mechanism comprising, in combination, a rotatable drag lever associated with one of said reels for limited rotation therewith to a predetermined position in accordance with the direction of rotation of said reel, first braking means adapted to brake the left hand tape reel, second braking means adapted to brake the right hand tape reel, means for moving said first and second braking means to operative positions, and blocking means responsive to movement of said rotatable drag lever for preventing the braking means associated with the take-up reel from being moved to operative position.

11. For use in a tape recorder having left and right hand tape reels and drive means for moving the tape in either direction from a feeding reel to a take-up reel, braking mechanism comprising, in combination, a rotatable drag lever associated with one of said reels for limited rotation therewith to a predetermined position in accordance with the direction of rotation of said reel, clutch means for providing a driving connection between said one reel and said drag lever for effecting said limited rotation of said lever in the direction of rotation of said one reel, first braking means adapted to brake the left hand tape reel, second braking means adapted to brake the right hand tape reel, means for moving said first and second braking means to operative positions, and blocking means responsive to movement of said rotatable drag lever for preventing the braking means associated with the take-up reel from being moved to operative position.

References Cited by the Examiner

UNITED STATES PATENTS

| | | | |
|---|---|---|---|
| 2,563,545 | 8/1951 | Moreland et al. | 242—54.1 X |
| 2,741,439 | 4/1956 | Dale et al. | 242—55.12 |

MERVIN STEIN, *Primary Examiner.*

RUSSELL C. MADER, *Examiner.*